(No Model.)
F. C. RANDALL.
CHECK ROWER FOR SEED PLANTERS.
No. 272,476. Patented Feb. 20, 1883.
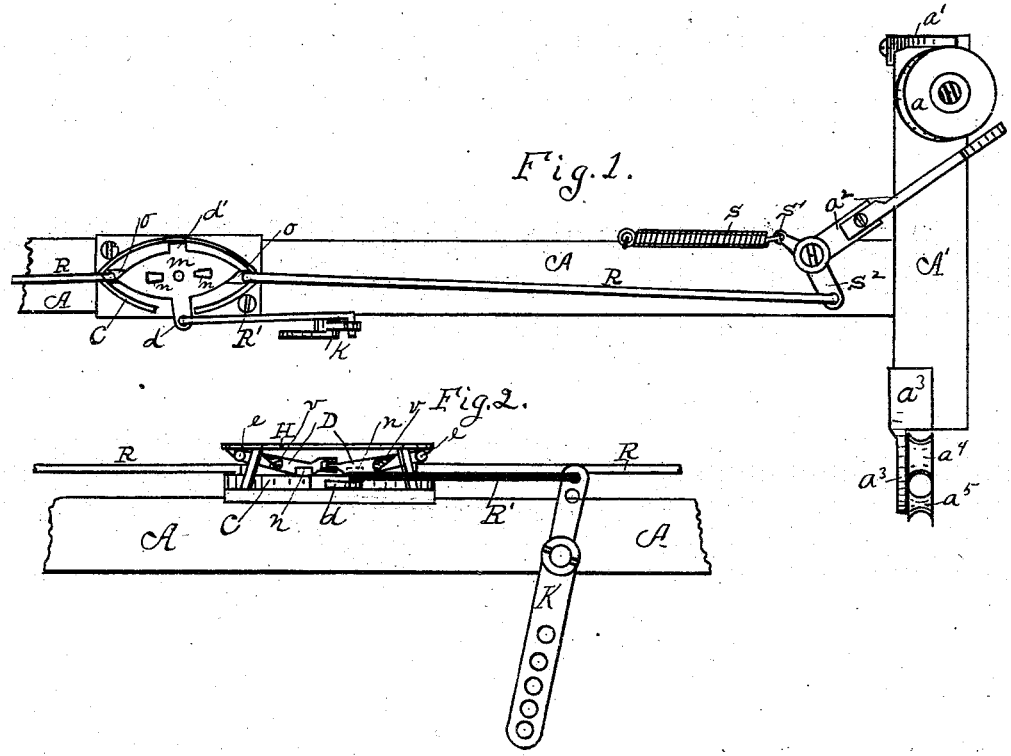
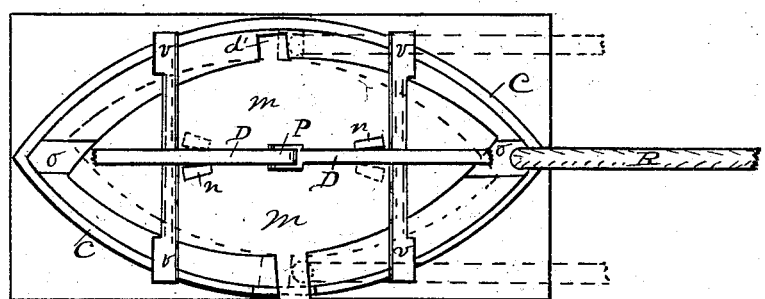
Witnesses.
Thos. H. Hutchins.
Wm. J. Hutchins.
Inventor.
Frank C. Randall.

UNITED STATES PATENT OFFICE.

FRANK C. RANDALL, OF JOLIET, ILLINOIS.

CHECK-ROWER FOR SEED-PLANTERS.

SPECIFICATION forming part of Letters Patent No. 272,476, dated February 20, 1883.

Application filed November 1, 1882. (No model.)

*To all whom it may concern:*

Be it known that I, FRANK C. RANDALL, of the city of Joliet, in Will county, and State of Illinois, have invented certain new and useful Improvements in Check-Rowers for Seed-Planters, the construction and operation of which I will proceed to explain, reference being had to the annexed drawings and the letters and figures thereon, making a part of this specification, in which—

Figure 1 is a plan view on the top of one end; Fig. 2, a front elevation of the center portion; Fig. 3, a plan view on the top of the center movements, and Fig. 4 a central vertical sectional view of the central working parts of the machine.

This invention relates to an attachment for seed-planters for the purpose of enabling the planter to drop the seed in hills in rows each way across the field, without the necessity of marking the ground before planting, by means of a stationary knotted wire stretched across the field to actuate the machinery.

Referring to the drawings, A represents the main beam of the device, having at either end the ordinary cross-head A', and sheaves for conducting and holding the knotted wire that passes through them, and the oscillating forked lever $a^2$, which, by means of the connecting-rods R, actuates the working parts of the machine at or near the center of the machine. These cross-heads A' and the sheaves and forked lever I do not claim as new. The parts I have invented are located at or near the center of the machine, and consist in the use of the oscillating cam $m$, with its attachments, for the purpose of actuating the drop-lever $k$. The oscillating cam $m$ is pivoted to the top of the beam A by a pin or bolt through its center on a plate having the raised guard $c$, inclosing the cam $m$, as shown in Fig. 3. The space inclosed by this guard $c$ is larger than the cam $m$, so the cam may oscillate within it, as shown by the dotted lines in said figure. The oscillating cam $m$ is provided with integral lugs $d$ and $d'$ on either side, as shown in Figs. 1 and 3, one of which, $d$, projects out through an opening in the raised guard $c$, and has attached to it the connecting-rod R', connecting it with the lever $k$, as shown in Figs. 1 and 2. One end of the connecting-rod R is formed in an elbow, $R^2$, (shown in Fig. 4,) and hooks over within the guard $c$, while its opposite end is connected to the forked lever by the bell-crank $s^2$ $a^2$, Fig. 1. When the forked lever oscillates it reciprocates the rod R back and forth, causing its hooked end $R^2$ to traverse the space between the guard $c$ and the cam $m$, first down one side of the cam and then down the other, until it strikes the projecting lugs $d$ and $d'$ alternately to oscillate the cam first one way and then the other, as shown by the dotted lines in Fig. 3. In Fig. 3, should the rod R move forward, it would pass down between the guard $c$ and the cam $m$ until it came in contact with lug $d$, moving it with the cam forward and oscillating the cam, as shown by the dotted lines. On its return and next forward movement it would pass down between the guard $c$, on the other side of the cam, until it came in contact with lug $d'$, leaving the cam in the position shown in said Fig. 3 and in Fig. 1, and so on alternately up one side and down the other of the cam, oscillating it either way, by means of which and the rod R' the drop-lever $k$ is operated to actuate the seed-slide of the planter.

In order to lock the cam $m$ fast either way, so the seed-slide cannot rebound, the following device is used: A cover, H, Fig. 2, covers the cam, resting on suitable legs. At either end, on the under side of the cover H, is hinged at $e$ a lever, D. (Shown also in Fig. 3.) These two levers D hinge together at their inner ends at P, so when one rises it will raise the other also. These levers D each have integral cross-arms $v$ at about their center, extending each way out over the guard $c$, as shown in Fig. 3, so that when the rod R moves forward it will pass under these cross-arms $v$, alternately elevating them, with the levers D, high enough so the pins or lugs $n$ $n$ on the top of and attached to the oscillating cam $m$ may pass under the levers D to permit the cam $m$ to oscillate. It will be observed that the rod R, in passing down by the side of the cam, must first pass under the extending arm $v$ before it comes in contact with the lugs $d$ or $d'$, so as to first elevate the levers D up, so the lugs $n$ $n$ may pass under the levers D and permit the cam to oscillate. When the rod R returns out from under the arm $v$ the levers D fall down behind the lugs $n$ $n$ and prevent oscillation of the cam until caused to oscillate by the next movement down of the rod R. By this means the cam is locked at each oscillation either way, thereby preventing the seed-slide from rebounding either way. When the rod R is in the position shown in Figs. 1, 3, and 4 the elbow end R² rests in a channel, o, the sides of which form a guide to direct the course of the rod R straight ahead, so it will not pass down the wrong side of the cam. The coil-spring s returns the forked lever after the knot has let it loose, and with it the rod R, to the position shown in Fig. 1.

Both ends or heads of the machine are alike, so the description of one applies to both, and they both alternately operate the center movements described.

Having thus described my invention, what I claim as new, and desire to secure by Letters Patent, is as follows, to wit:

1. The combination of the cam m, having the lugs d and d', and pitman-rod R, having the hook R', adapted to traverse the space between said cam and the guard c, as and for the purpose set forth.

2. The combination of the beam A, forked lever $a^2 s^2$, connecting-rod R, having the bent end R², guard c, oscillating cam m, having the lugs d d' and n n, hinged levers D D, having the cross-arms v, cover H, rod R', and lever k, as and for the purpose set forth.

3. In a check-rower for seed-planters, the levers D D, having the cross-arms v, in combination with the lugs n n on the cam m, and the rod R, having the bent end R², for the purpose set forth.

FRANK C. RANDALL.

Witnesses:
WM. J. HUTCHINS,
THOS. H. HUTCHINS.